CONTROL FOR RETRACTIBLE TRANSDUCERS

Filed June 8, 1956 2 Sheets-Sheet 1

INVENTORS.
DONALD T. BEST
HARVEY A. DRUKER
OTTO HOHNECKER
BY
AGENT

CONTROL FOR RETRACTIBLE TRANSDUCERS

Filed June 8, 1956 2 Sheets-Sheet 2

INVENTORS.
DONALD T. BEST
HARVEY A. DRUKER
OTTO HOHNECKER
BY
AGENT

United States Patent Office 3,005,676
Patented Oct. 24, 1961

3,005,676

CONTROL FOR RETRACTIBLE TRANSDUCERS

Donald T. Best and Harvey A. Druker, Philadelphia, and Otto Hohnecker, Morrisville, Pa., assignors to Burroughs Corporation, Detroit, Mich., a corporation of Michigan Filed June 8, 1956, Ser. No. 590,286
14 Claims. (Cl. 346—74)

This invention relates to velocity sensitive control circuits and while of broader applicability it is particularly related to control circuits for use with electromagnetic transducers which operate in conjunction with a magnetic storage medium to record and read data in computing and like apparatus.

A conventional type of transducer, or magnetic head, employed in electronic computers to record and read digital data has a magnetic circuit with which one or more windings are linked and which includes a narrow air gap. The head is commonly mounted by stationary means with the gap in close proximity to the storage medium, which may be a thin layer of magnetizable material on the surface of a rotatably mounted disk or drum. In recording, signal excitation of a winding produces an external magnetic field in the vicinity of the gap for magnetization of the storage medium while in reading, variable flux received from the magnetized medium generates a signal voltage in the same or another winding of the head.

When a disk of appreciable size is employed as the support for the magnetizable material, there is a tendency for the disk to warp, causing during rotation thereof, what is known as "surface runout." With a rigidly mounted head, the variaton in head-to-disk spacing due to runout causes irregular changes in the strength of the recorded or of the read signals, as the case may be.

Structures overcoming these disadvantages from the subject matter of pending applications in the name of Epstein et al., entitled, "Mounting for Magnetic Heads," Serial No. 519,218, filed June 30, 1955, and in the name of Hohnecker entitled, "Retractible Memory Head," Serial No. 587,990, filed May 29, 1956, both of which are assigned to the assignee of the present application. In both of the structures shown in these applications the magnetic head is movable to an extended operative position to ride on a thin cushion of air close to the magnetizable surface of the disk, and a retracted inoperative position removed from the disk surface. Movement is effected by a solenoid when a switch closes a power circuit including the solenoid.

The cushion of air upon which the head rides—or floats—is formed when the disk reaches a certain speed of rotation, and therefore it is undesirable to have the head lowered to its operative position until the disk reaches that speed, otherwise the bottom of the head structure would contact the disk surface and damage both it and the head.

Broadly, it is an object of the invention to provide a control circuit responsive to motor velocity.

It is also an object of the present invention to provide means for automatically controlling the positioning of a magnetic head assembly with respect to the magnetizable surface of a rotatable disk.

Another object is to provide means responsive to speed conditions of a rotatable disk to control the positioning of a head assembly with respect to a magnetizable material on a disk, to prevent damage to both.

Still another object is to provide a control mechanism for a magnetic head assembly of the type operating in combination with a high speed rotating disk having a magnetic storage material on a surface thereof and wherein the mechanism includes an electrical circuit functioning in response to a predetermined speed of the disk drive motor to position the assembly in operative spaced relation to the disk surface.

It is also an object to provide such a control mechanism functioning in response to disk stoppage to retract the assembly from its operating position.

Figure 1:
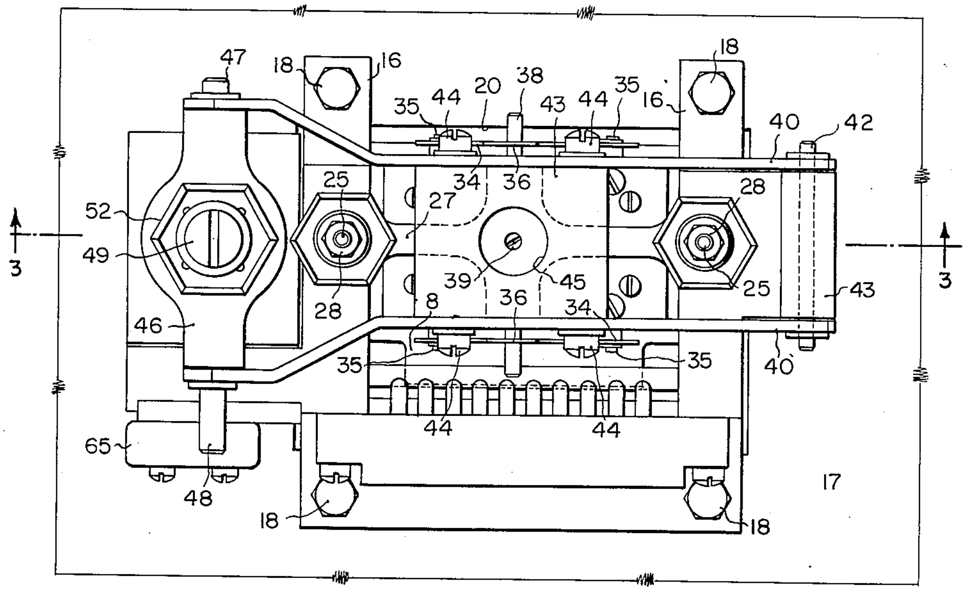
FIGURE 1 is a plan view of a magnetic head assembly.
Figure 2:
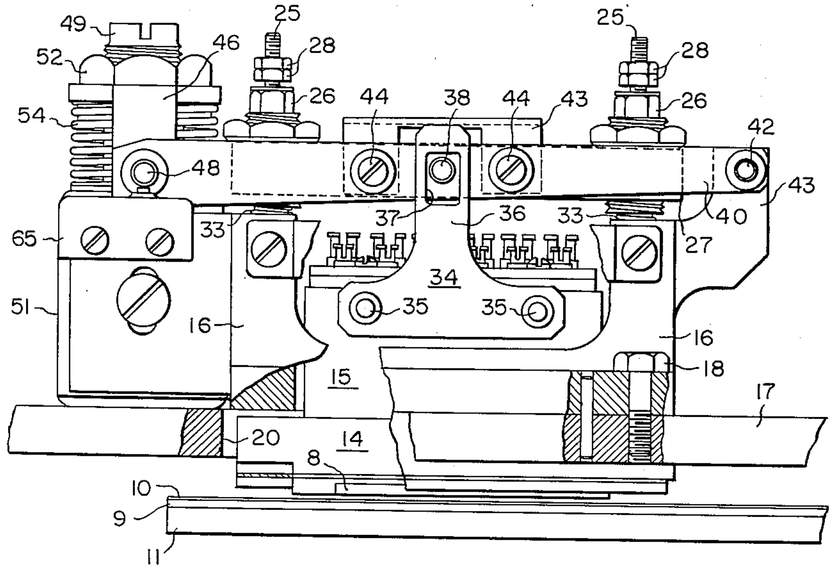
FIGURE 2 is a side elevation view of the same with parts broken away and showing the assembly in operative position.
Figure 3:
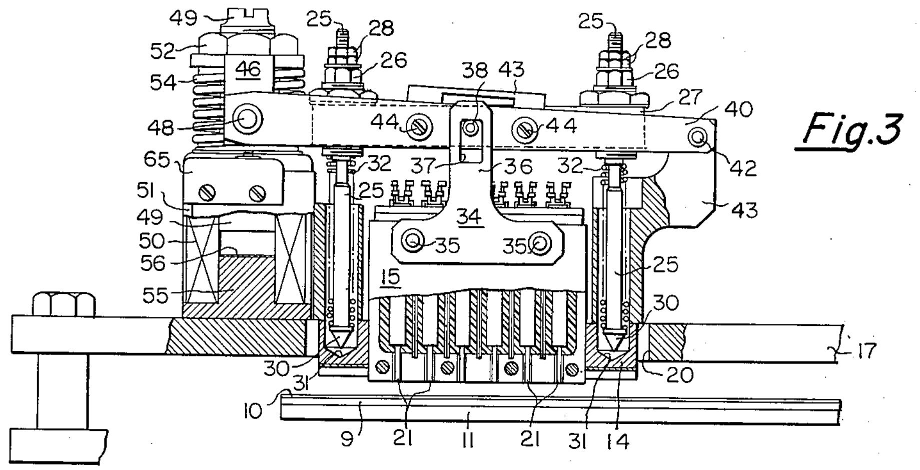
FIGURE 3 is a view similar to FIGURE 2 but showing the assembly in retracted position with parts shown in section as taken on line 3—3 of FIGURE 1.

Referring to the drawings, and particularly to FIGURES 1, 2, and 3, one form of magnetic head structure to be controlled in accordance with the present invention is shown in association with a circular disk 9 of non-magnetic material having on its upper face magnetizable material 10, such as powdered iron oxide dispersed in a solidified resinous vehicle. Disk 9 is carried by a turntable 11 which is keyed or otherwise secured to a shaft 12 (FIGURE 5) for rotation about its axis by a motor 13, said rotation being in one direction only, during operation of the assembly.

For recording, reproducing or both, there is provided a magnetic head assembly comprising a base 14 of non-magnetic material having an upstanding integral body 15 positioned between standards 16 extending from and attached to a stationary frame plate 17 by studs 18. Plate 17 is formed with an aperture 20 radially disposed with respect to the axis of disk 9 to permit passage of the magnetic head, such aperture 20 being complemental to the shape of base 14 and located between standards 16. Base 14 is a sub-assembly comprising magnetic heads 21 embedded in and exposed on the bottom face of the base to lie in juxtaposed relation to the surface of disk 9. Heads 21 are of conventional design including windings linked with a high permeability magnetic structure having a gap of a few thousandths of an inch in width.

As a means for obtaining the desired movement and adjustment of the head assembly, base 14 has its opposite ends respectively in alignment with two spindles 25, see FIGURE 3, extending through the respective standards 16 to pass through externally threaded adjusting nut bushings 26. These bushings are respectively threaded into the ends of a cross-bar 27 while the projecting ends of spindles 25 carry adjusting and lock nuts 28. The lower end of each spindle 25 terminates in a collared head 30 for seating in a cup 31 in base 14, while a compression spring 32 encircles the spindle to seat at opposite ends against head 30 and bushings 26. By turning nuts 28 on spindles 25 the compression of springs 32 can be preset to the required downward pressure to balance a counter aerodynamic pressure introduced between the head assembly and the surface of disk 9. This pressure is developed by the stream of air induced, by the disk velocity, to enter between the head assembly and the disk when the latter is at operating speed which is illustratively of the order of 3600 r.p.m. This stream of air functions as a cushion support to float the head assembly. As a related adjunct for effective air response, base 14 has a rounded leading edge or may have a shoe 8 with a chamfered end, attached to its lower face in juxtaposed relation to the disk, both said rounded edge and chamfered shoe channelling the air beneath the assembly, as more particularly described in the aforementioned co-pending applications.

For retracting the head assembly, hangers 34 are attached by studs 35 to opposite sides respectively of body 15, each such hanger 34 having an upwardly disposed extension 36 formed with a slot 37 for the passage of a pivot pin 38 to provide a lost motion allowing a relatively slight downward movement of pivot pin 38 to follow the movement of the cross-bar after the head assembly reaches its operative position, at which time it is substantially freely floating upon the air cushion. Pin 38 passes transversely through cross-bar 27 with its ends extending respectively through two lever arms 40. At one end, lever arms 40 are pivotally mounted as by pin 42 to a bracket 43 conveniently attached to one of standards 16. The two lever arms 40 are preferably laterally braced by a U-shaped apertured bridge piece 43 transversely disposed across the top of arms 40 and fixed thereto by studs 44. The aperture 45 in bridge piece 43 permits the insertion of a set screw 39 to fasten cross-bar 27 to pin 38.

The free ends of arms 40 project beyond pin 38 to straddle a yoke 46 and are respectively pivotably connected thereto by pivot studs 47 and 48. Yoke 46 is centrally apertured for the passage of the threaded end of a plunger 49 of a solenoid 50 housed in a casing 51, fastened to one of the standards 16. Nut 52 on the projecting plunger end overlie yoke 46 and serves as a pull down for cross-bar 27, the downward movement of which is transmitted through springs 32 to base 14 to lower the assembly to its operative position juxtaposed to disk 9. This pull down movement operates when solenoid 50 is energized at the time rotating disk 9 attains its maximum velocity, as otherwise the assembly would seat on the disk. The assembly is retracted to inoperative position by a compression spring 54 interposed between yoke 46 and casing 51 and operative when the solenoid is deenergized, thereby to bias lever arms 40 in the direction to retract the assembly through the medium of the cross-bar pin 38 riding upward in slots 37 to lift hangers 34 and the attached head assembly.

To arrest the movement of the plunger at the predetermined operative pressure with which the energized solenoid forces the head assembly toward the magnetizable material 10 of the rotating disk, solenoid 50 is provided with a fixed stop 55 located in the inward path of movement of plunger 49. Stop 55 is capped by a non-magnetic plate 56 to be contacted by plunger 49 in its stopped position. The operative speed of the disk carries air to be forced between the assembly and the disk, forming an air cushion on which the assembly is floating. The air pressure reacts against the preset balancing pressure of springs 32 and by reason of the lost motion between hangers 34 and pin 38 and the clearance thereabout, the assembly is free floating and self adjusting.

In connection with the energizing of solenoid 50, it is important to understand that this should not take place until the motor has attained near maximum velocity as otherwise magnetizable surface of disk 9 will be damaged by contact with base 14. In other words, the stream of air below the assembly is not sufficient to support the assembly until the velocity reaches a predetermined magnitude. Because of this and in accordance with this invention, the control of the solenoid energization is made responsive to the motor speed as a means to protect the apparatus from damage.

Figure 4:
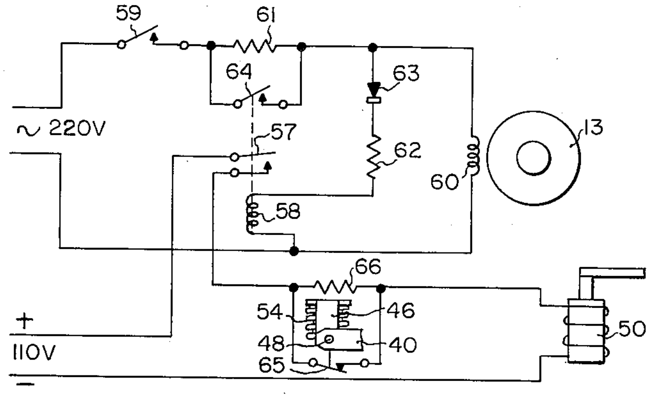
FIGURE 4 is a circuit diagram showing one form of speed control in accordance with the invention.

In particular accordance with the present invention and with reference to FIGURE 4, means for accomplishing this control is shown wherein the solenoid is included in a 110 v. D.C. circuit having a switch 57 arranged to be closed by a relay 58 located in a shunt across the circuit of the main winding 60 of the motor 13. This motor circuit is connected to a voltage source of, say, 220 v. A.C. and includes a main switch 59 in series with a resistance 61 to cause a voltage drop of approximately 60 volts across this resistance and a drop of 160 volts across the main motor winding 60, thereby compensating for the initial current surge. When switch 59 is closed the velocity of the motor is zero while the surge current is nearly 20 amps. so that as the speed of the motor approaches a maximum the current in the motor winding 60 is receding toward an equilibrium level of approximately 4 amps. The shunt includes relay 58, a resistance 62 and a rectifier 63 to supply the relay with D.C. voltage. Relay 58, not only controls switch 57, but simultaneously also a switch 64, in parallel with resistance 61, which, when closed by relay action, short circuits resistance 61 to provide a steady voltage to the motor winding 60 while also holding relay 58 energized.

For initially energizing solenoid 50, the D.C. circuit includes a normally closed micro-switch 65 in series with the solenoid and has its contactor located in the downward path of movement of projecting stud 48 carried by yoke 46. This micro-switch 65 is in parallel with a resistance 66 and serves, when opened by the inwardly moving plunger 49, to divert the voltage through the resistance to hold the solenoid energized with a safe voltage. From the foregoing it will be seen that any interruption of the motor circuit causes relay 58 to be deenergized whereupon expansion of plunger spring 54, operating through the yoke 46, arms 40, pin 38, retracts the head assembly to inoperative position spaced from the disk.

Figure 5:
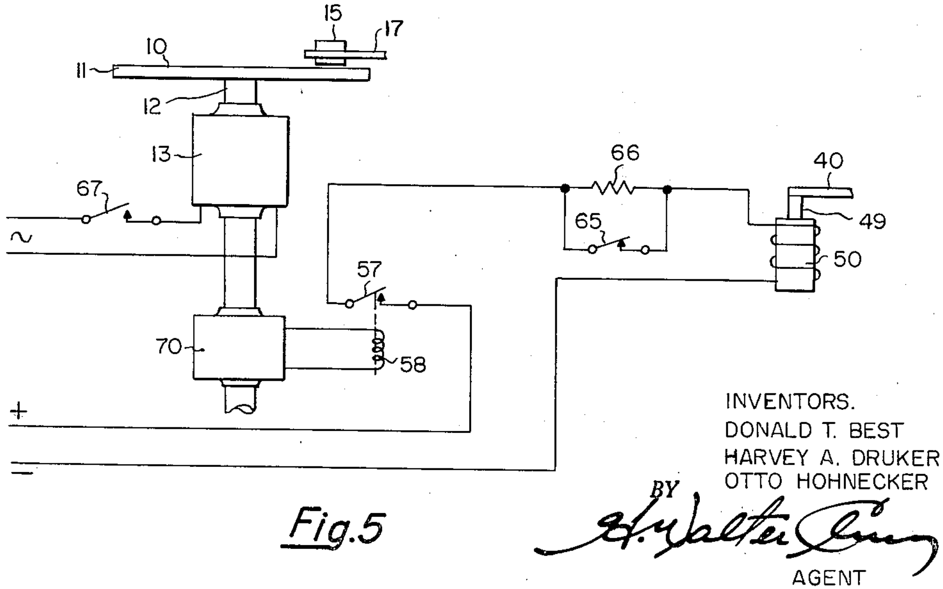
FIGURE 5 is a modified circuit diagram for response to the speed of the magnetic disc.

In the modification of FIGURE 5, a further means is provided to protect the magnetic material 10 from damage, this means being operative in case relay 58 should remain energized even though the motor should have stopped. Solenoid 50 and its circuit are controlled in this instance, directly by the speed of the motor. In this modification motor 13 is operated by a circuit from an A.C. or other source of voltage and includes a main switch 67 for starting and stopping. The solenoid circuit is the same as described for the circuit just described, having a D.C. source of voltage, the solenoid 50, micro-switch 65 in shunt about resistance 66, and switch 57 is under control of relay 58, except in this form the relay is in the output circuit of a permanent magnet generator 70 keyed or otherwise made fast to shaft 12 of motor 13. Thus while the solenoid operates as a function of the speed of the motor, it has the additional advantage of always deenergizing relay 58 upon motor stoppage. Also it should be noted that micro-switch 65 is initially closed as a by-pass around resistance 66, in order to supply full energizing voltage to the solenoid, after which a lower holding voltage operates to hold the solenoid energized. This lower voltage results from the opening of the micro-switch 65 by the downwardly moving stud 48, picking up switch 65, as plunger 49 is drawn inward by the energized solenoid 50, and as a result the voltage is shifted through resistance 66. In this way the solenoid coil is protected from the initial full voltage which could readily burn out the coil if continued throughout a normal energizing cycle.

In the modification of FIGURE 5, it will be evident that a motor stoppage ensures the head assembly being promptly lifted from its operating position with respect to the magnetic material 10 of the disk.

It will now be apparent that the invention provides control means which functions in response to the speed of rotation of a motor, particularly to move a magnetic assembly toward and away from the reading or recording surface of a magnetic disk.

The main desideratum in the illustrated embodiment is to guard against detrimental contact between the assembly and the disk while the disk is rotating, thereby preventing damage to the surface of the disk, or to the head itself. Such desideratum has been attained by the novel means here shown and described.

What is claimed is:

1. In a memory storage system the combination of, a rotatable magnetizable member, means for rotating said member in one direction for recording and reading information and at a speed sufficient to generate a cushion of air on the surface of said member, a magnetic head assembly, means for mounting said assembly for movement between a retracted inoperative position away from said member and to an extended operative position on said cushion of air close to said member, and means responsive to said speed of rotation of said member for moving said assembly from its retracted inoperative position towards said member to assume its operative position on the cushion of air.

2. In a memory storage system the combination of, a rotatable magnetizable member, means for rotating said member in one direction for recording and reading information and at a speed generating a cushion of air on the surface of said member, a magnetic head assembly, means for mounting said head assembly for movement from a retracted inoperative position away from said member to an extended operative position on said cushion of air close to said member, means for moving said head assembly to said extended operative position on said cushion of air, and means responsive to a reduced speed of rotation of said member for moving said assembly from its extended operative position to its retracted inoperative position away from said disk.

3. In a memory storage system, the combination of a rotatable magnetizable disk, means for rotating said disk, a magnetic head assembly, means mounting said assembly for movement toward and away from operative relation with said disk, means including a solenoid for shifting said assembly from one position to another, means responsive to a speed of rotation of said disk for energizing said solenoid to shift said assembly in one direction, and means to move said assembly in the opposite direction when said solenoid is deenergized.

4. In a memory system according to claim 3 wherein the energized solenoid shifts the assembly toward said disk.

5. In a memory storage system, the combination of a rotatable disk, a magnetizable material upon the surface of said disk, a motor for rotating said disk, a magnetic head assembly, means suspending said assembly for movement between operative and inoperative positions toward and away from said surface respectively, means including a solenoid for controlling said suspending means, an electric circuit including said solenoid, a second electric circuit including a winding of said motor, and means responsive to the voltage on said winding at a predetermined motor speed for closing said first circuit to energize said solenoid, whereby said suspending means lowers the assembly to operative position relative to said disk.

6. In a memory storage system according to claim 5 wherein means responsive to a decrease of motor speed below said predetermined speed is provided to retract said assembly to its inoperative position.

7. In a memory storage system according to claim 5 wherein said responsive means includes a relay for opening said first circuit to deenergize said solenoid and means including a spring biased solenoid plunger for retracting said assembly to inoperative position.

8. In a memory storage system, the combination of a rotatable disk, a motor for rotating said disk, a magnetic head assembly, means suspending said assembly for movement toward and away from said disk, said means including a pivoted lever, a solenoid, a plunger for said solenoid connected to one end of said lever, a spring biasing said plunger and lever to hold said assembly retracted when said solenoid is deenergized, an electric circuit including said solenoid, and means actuated at a pre-determined motor speed for closing said circuit, whereby said solenoid is energized to cause said lever to move said assembly in to operative position juxtaposed to said disk.

9. In a memory storage system according to claim 8, wherein said actuating means is a relay circuit including a generator driven by said motor.

10. In a memory storage system, the combination of a rotatable disk, magnetizable material on a surface of said disk, a motor for rotating said disk, a magnetic head assembly, means suspending said assembly for movement toward and away from said material, a circuit including a solenoid and a switch, a second circuit, a relay in said second circuit operatively associated with said switch, control means for energizing and deenergizing said relay to open and close said switch, said relay control means being operated by a voltage developed by motor speed, means actuated by the energizing of said solenoid when said switch is closed to move said assembly to operative position juxtaposed to said disk, and means actuated by the deenergizing of said solenoid when said switch is open to retract said assembly.

11. In a memory storage system, the combination of a rotatable magnetic disk, means for rotating said disk, a magnetic head assembly, means including a lever pivoted at one end for suspending said assembly for movement toward and away from said disk, a solenoid having a plunger arranged for movement parallel to the path of said assembly, a pivotal connection between the free end of said lever and said plunger, means actuated by a predetermined motor speed for energizing said solenoid to move said plunger in one direction to shift said assembly, and a spring biasing said plunger in the opposite direction when said solenoid is deenergized by a motor speed below the predetermined speed.

12. In a memory storage system, the combination of a rotatable member, a magnetizable material upon a surface of said member, a motor for rotating said member, a magnetic head assembly, means suspending said assembly for movement between operative and inoperative positions toward and away from said surface respectively, means including a solenoid for controlling said suspending means, an electric circuit including said solenoid, a second electric circuit including a winding of said motor, and means responsive to the voltage on said winding at a predetermined motor speed for closing said circuit to energize said solenoid, whereby said suspending means lowers the assembly to operative position relative to said surface.

13. A memory storage system according to claim 12 and including means responsive to a decrease of motor speed below said predetermined speed to retracting said assembly to its inoperative position relative to said rotating member.

14. In a memory storage system according to claim 13 wherein said responsive means includes a relay for opening said first circuit to deenergize said solenoid and means including a spring biased solenoid plunger for retracting said assembly to inoperative position relative to said rotating member.

References Cited in the file of this patent

UNITED STATES PATENTS

| | | |
|---|---|---|
| 1,366,617 | Wier et al. | Jan. 25, 1921 |
| 2,328,539 | Greenleaf et al. | Sept. 7, 1943 |
| 2,484,781 | Coffey | Oct. 11, 1949 |
| 2,542,590 | Stone | Feb. 20, 1951 |
| 2,683,244 | Salaun et al. | July 6, 1954 |
| 2,700,123 | Clark | Jan. 18, 1955 |

FOREIGN PATENTS

| | | |
|---|---|---|
| 763,780 | Great Britain | Dec. 19, 1956 |